Dec. 5, 1950     R. S. COATE     2,532,759
CATHODE-RAY TUBE TESTER
Filed Sept. 30, 1949
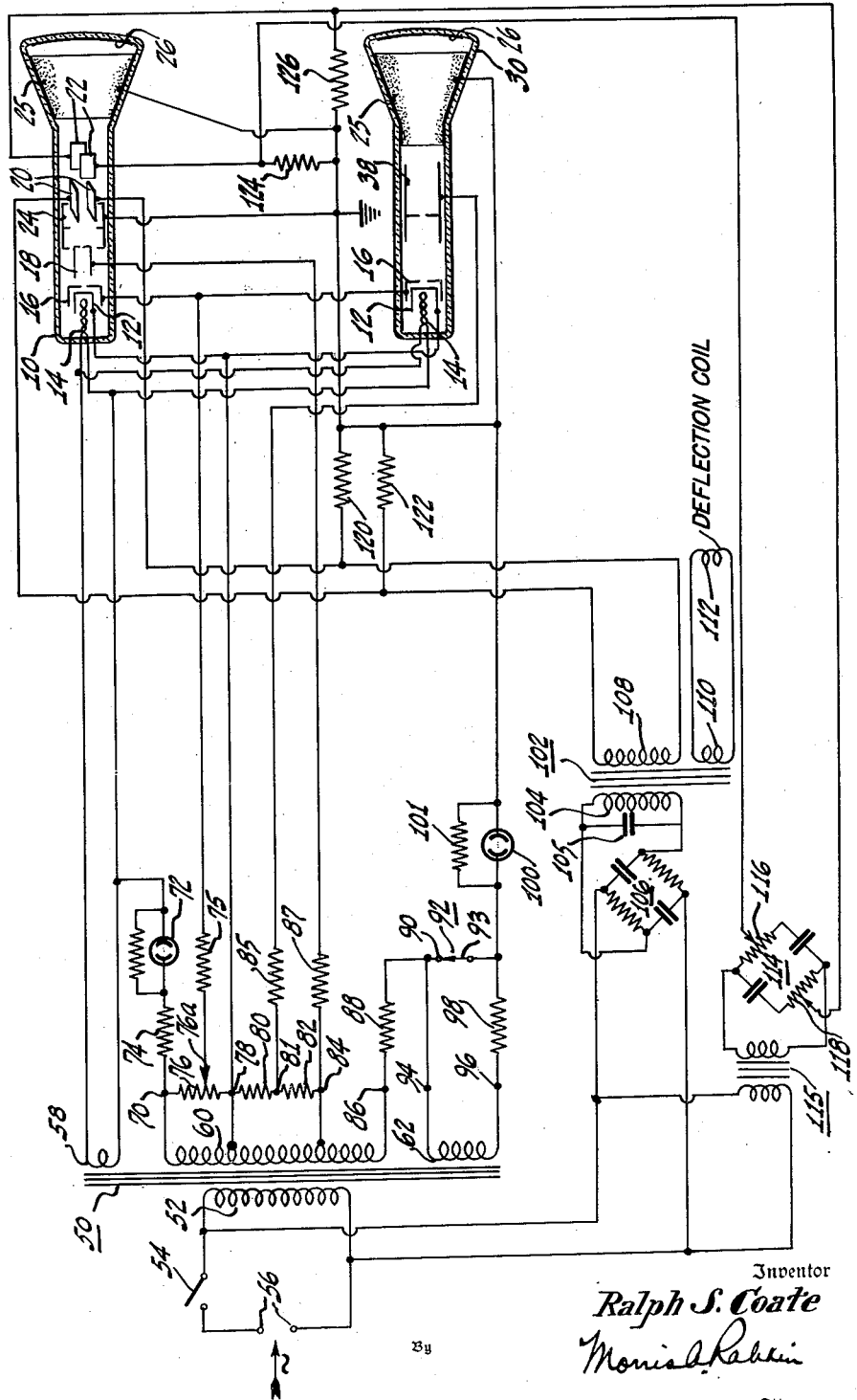
Inventor
Ralph S. Coate
By Morris A. Rabkin
Attorney Patented Dec. 5, 1950

2,532,759

UNITED STATES PATENT OFFICE 2,532,759

CATHODE-RAY TUBE TESTER

Ralph S. Coate, Haddonfield, N. J., assignor to Radio Corporation of America, a corporation of Delaware Application September 30, 1949, Serial No. 118,911

7 Claims. (Cl. 315—365)

This invention relates to cathode ray tube testing apparatus, and particularly to such an apparatus utilizing only alternating voltages.

The widespread use of cathode ray tubes in oscilloscopes, television cameras and receivers, navigational aids, and the like, has developed a need for a simple system of testing such tubes. Various complicated devices have been proposed for this purpose, but since such devices usually involve a relatively large number of control dials, as well as various meters and indicators, all of which complicate the problem of obtaining a rapid check on the operating characteristics of a tube, they are inconvenient, to say the least, for making rapid tests.

Since cathode ray tubes generally are operated with unidirectional voltages of suitable polarity and magnitude, it is customary to use unidirectional voltages in cathode ray tube testing apparatus. However, most power supply systems provide alternating voltages to the consumer, so that various rectifying circuits are required for producing unidirectional voltages in cathode ray tube testing apparatus, and all such circuits add to the expense and complexity of the testing equipment.

I have found that the most commonly encountered faults in cathode ray tubes can be detected with alternating test voltages, and that a simple and efficient testing apparatus can be constructed which does not require the use of rectifiers, amplifiers, or similar expensive components, and one which involves a minimum number of controls and indicators.

It is, accordingly, a general object of the present invention to provide a simplified apparatus for testing cathode ray tubes.

Another object of the invention is to provide an alternating voltage cathode ray tube tester.

A further object of the invention is to provide a tester of the foregoing type adapted to test either electrostatic deflection type or magnetic deflection type cathode ray tubes.

In accordance with the invention, the foregoing and other related objects and advantages are attained in an apparatus wherein means are provided for obtaining alternating voltages of suitable magnitude for operating a cathode ray tube, together with phase shifting networks arranged to overcome certain of the difficulties which otherwise would be encountered in a cathode ray tube testing system utilizing only alternating voltages.

A more complete understanding of the invention can be had from the following description of an illustrative embodiment thereof, when considered in connection with the accompanying drawing, the single figure of which is a schematic diagram of a cathode ray tube testing apparatus embodying the principles of my invention, together with typical cathode ray tubes which can be tested with apparatus of the type contemplated herein.

Referring to the drawing, there is shown a so-called electrostatic deflection type cathode ray tube 10 having an electron-beam-forming gun comprising a cathode 12, adapted to be heated by a filament 14 to serve as a source of electrons, a control grid 16 to regulate the electron beam current, a first or focusing anode 18 which cooperates with the electrodes 12, 16 to form an "electron lens" for focusing the cathode ray beam, a high voltage anode 24 which serves to accelerate the electrons in the beam, two pairs of orthogonally related beam deflecting plates 20, 22, and a fluorescent screen 26 upon which the electron beam impinges to produce a desired image. In some cases, the tube 10 may contain a further anode comprising a conductive coating 25 adjacent the screen 26. This additional anode often is connected internally to the high voltage anode 24, and, if not so connected, can be connected externally for testing purposes, as shown.

Also shown in the drawing is a cathode ray tube 30 of the so-called magnetic deflection type containing a cathode 12, a filament 14, a control grid 16, a second or screen grid 38, and a high voltage anode 25. As is well known, the purpose of the screen grid 38 is to screen the region between the cathode 12 and the anode 25 in order to reduce the value of negative control grid voltage necessary to cut off the beam current. Focusing and deflection coils (not shown) usually are placed around the neck of the tube 10 in the region between the screen grid 38 and the anode 25 to focus and deflect the electron beam in a manner well known in the art.

It will be understood that the tubes 10, 30 are merely illustrative of the two major types of cathode ray tubes, and that a testing apparatus of the type to be described can be modified as necessary to accommodate any particular tube of either type.

The testing apparatus shown in the drawing is adapted to provide suitable voltages for operating either the electrostatic tube 10 or the electromagnetic tube 30 in order that certain tests can be made, as will be described, and comprises a transformer 50 having a primary winding 52, connected through a switch 54 to a pair of input terminals 56, and three secondary windings 58, 60, 62. In the drawing, direct connections are shown from various points on the secondary windings 58, 60, 62, as well as from other points in the testing circuit, to selected electrodes in the tubes 10, 30, it being understood that sets of adaptor plugs and sockets can be provided in order to make these connections to different types of cathode ray tubes. For example, in a typical apparatus embodying my invention, it was found that 7 sets of adaptor plugs were adequate to allow testing of 32 different types of oscilloscope and television tubes. For the sake of simplicity, the testing apparatus is shown connected to both of the tubes 10, 30, it being understood that only a single tube would be connected to the apparatus under operating conditions, and that adaptor plugs and sockets would be utilized as already mentioned.

One of the secondary windings 58 on the transformer 50 is connected to the filaments 14 in the tubes 10, 30, and one end of the filament winding 58 is connected to an end terminal 70 of the adjacent winding 60 through a "glow tube" indicator 72 and a resistor 74. A potentiometer type resistor 76 is connected between the end terminal 70 and a second terminal 78 of the secondary winding 60, with the potentiometer arm 76a being connected to the control grids 16 of the tubes 10, 30, and the second terminal 78 being connected to the tube cathodes 12.

Since the indicator 72 is connected in circuit between the filament winding 58 and the terminal 78 (which is connected to the tube cathodes 12), if the tube being tested has a "short" between the filament and the cathode, this fact will be indicated by the indicator 72. The purpose of the potentiometer 76 will be referred to hereinafter.

A pair of resistors 80, 82 are connected to form a voltage divider between the terminal 78 and a third terminal 84, and a connection is made from the junction 81 of the resistors 80, 82 to the screen grid 38 of the tube 30 through a resistor 85, while a connection is made from the third terminal 84 to the first anode 18 of the tube 10 through a resistor 87.

The end terminal 86 on the transformer winding 60 is connected through a resistor 88 to a fixed contact 90 of a normally closed switch 92, as well as to one terminal 94 of the secondary winding 62. The other terminal 96 of the winding 62 is connected through a resistor 98 to the movable contact 93 of the switch 92, and is also connected through a "glow tube" indicator 100 to ground and to the high voltage anodes 24 of the tubes 10, 30.

It will be noted that the control grid 16 and the anode 24 of the tube 10 are connected to the transformer winding 60 (at the potentiometer arm 76a, and at the terminal 86, respectively) on opposite sides of the cathode connection (terminal 78), so that the voltage from the control grid 16 to the cathode 12 will be 180° out of phase with the anode-to-cathode voltage of the tube 10. Similarly, the cathode 12 of the tube 30 is connected to the transformer winding 60 (at terminal 78) between the control grid connection (potentiometer arm 76a) and the anode connection (terminal 86), so that the voltage from the control grid 16 to the cathode 12 will be 180° out of phase with the anode-to-cathode voltage of the tube 30. These connections will provide negative bias voltages for the control grids 16 in the tubes 10, 30 at times when the other electrode voltages are positive with respect to the cathode, thereby providing suitable biasing for proper tube operation. The magnitude of this bias voltage can be controlled by adjustment of the potentiometer arm 76a.

As long as the switch 92 is closed, the high voltage anode 24 of the tube being tested will receive voltage from the terminal 86 of the transformer winding 60 through the switch 92 and the indicator 100, since the switch 92 will short out the voltage across the winding 62. The voltage between the terminals 86, 78 of the winding 60 should be approximately equal to the lowest normal operating voltage of any tube type for which the tester is designed, so that any tube tested will produce a luminous spot on the tube screen. This, alone, will indicate that the tube is operative. If the tube being tested appears to "glow" internally, it usually indicates insufficient degassing or gas leakage. By varying the setting of the potentiometer arm 76a, the grid bias can be changed, and this should produce a change in the intensity of the luminous spot. If no change in spot intensity results, either a control-grid to cathode "short" or, possibly, a faulty grid connection, is indicated for the tube being tested.

When the switch 92 is opened, additional voltage (across the winding 62) will be applied between the high voltage anode 24 and the cathode 12 of the tube being tested. This additional voltage is made large enough so that "arcing" to the high voltage anode will occur if the tube has any defects likely to cause such arcing during normal operation. The indicator 100 is a two element tube of the type which will glow on one side in response to a unidirectional voltage, and will glow on both sides in response to a bi-directional voltage. If the high voltage anode current is normal (i. e. unidirectional), only one side of the glow tube 100 will be ignited. However, when "arc-over" occurs, current will flow in both directions through the indicator 100, causing both sides of the tube 100 to glow, thereby indicating arcing or high resistance leakage in the tube being tested.

The arrangement shown for applying additional anode voltage to the tube being tested is preferable to a switching arrangement wherein the anode connection is shifted between two high potential contacts, because with the arrangement shown, only one switch contact needs to be insulated for high voltage, whereas with a two contact system of the type mentioned, both contacts of the switch would require high voltage insulation.

The resistor 75 in the control grid circuit is provided to protect the tube grid by limiting the grid current during positive half cycles of grid voltage, while the resistors 74, 85, 87, 88, and 98 are provided to limit the current drawn through the transformer windings by the tube being tested in order to protect the transformer against heavy short circuit currents, as well as to protect personnel inadvertently coming in contact with any of the tester output terminals.

The voltage divider resistors 80, 82 determine the magnitude of the screen grid voltage for magnetic deflection type tubes, such as the tube 30, and could as well be replaced by an additional tap on the secondary winding 60.

Preferably, the high voltage anode connection is grounded, as shown, in order to protect personnel testing tubes of the type having an external "anode cap" connector which might accidentally be touched by the operator.

The testing apparatus also includes a second transformer 102, having a primary winding 104 which is connected to the input terminals 56 through a resistance-capacitance phase shifting network 106. The network 106 is arranged in conventional manner to produce substantially a 90° phase displacement between the voltage across the primary winding 104 and the voltage at the input terminals 56. A first secondary winding 108 of the transformer 102 is connected to the vertical deflection plates 20 in the tube 10, while a second secondary winding 110 of the transformer 102 is connected to a coil 112 which is intended to serve as a beam deflection coil for the tube 30.

The purpose of the phase shift network 106 will be clear from a consideration of the effect of applying in-phase alternating voltages to the electron gun and to the beam deflection system of the tube being tested. With in-phase voltages, maximum beam deflection would occur at the time that the cathode-anode voltage is at a maximum, so that the beam would be deflected off of the screen at the time maximum anode voltage occurs. This, of course, would be objectionable because little if any image would be produced on the tube screen. Consequently, the phase shift network 106 is provided so that the deflection voltage will be displaced in phase with respect to the anode-cathode voltage. Under these conditions, the alternating deflection voltage will sweep the beam repeatedly across the tube screen, and since the deflection voltage will be zero at the time when the anode-cathode voltage is maximum, the tube screen will be illuminated by a beam trace having maximum intensity at the center. By making the peak-to-peak value of the deflection voltage large enough to deflect the beam well beyond both edges of the screen, a trace of substantially uniform intensity can be obtained on the tube screen and this trace will serve to bring out any defects in the screen along the scanning path.

A capacitor 105 preferably is connected in parallel with the winding 104, and the capacitor and winding tuned approximately to parallel resonance at the frequency of the alternating voltage source in order to limit the current drawn through the phase shift network. This serves to increase the useful life of the phase shift network elements.

In the case of magnetic deflection type tubes, such as the tube 30, the trace on the tube screen can be rotated to allow examination of all parts of the screen simply by relative rotation of the deflection yoke and the tube being tested. However, since the deflection plates are fixed in position in the electrostatic tube 10, some other means is required for shifting the beam.

To this end, a variable phase shift network 114 is connected between the input terminals 56 and the horizontal deflection plates 22 in the tube 10, preferably through an isolation transformer 115. By simultaneously varying the setting of a pair of potentiometer-type resistors 116, 118 in the phase shift network 114, the phase angle between the voltages on the deflection plates 20, 22 can be varied approximately from zero to plus or minus 45 degrees, thereby changing the deflection pattern of the cathode ray beam from a straight line (at zero phase angle) into an elliptical pattern which gradually broadens out as the phase angle between the deflection voltages increases in one direction or the other. However, it should be noted that only one side of the ellipse will appear as a trace on the screen, since the anode-to-cathode voltage will be negative during half of each cycle, thereby eliminating one half of the elliptical trace. As the voltage on the deflection plates 22 is advanced or retarded in phase by adjustment of the phase shift network 114, the elliptical deflection pattern will broaden out, and the visible portion thereof will move toward one side or the other of the screen. If the peak-to-peak values of deflection voltage are made sufficiently large, the trace on the screen will appear as a nearly straight line which can be moved back and forth across the screen to allow examination for defects.

In order that the voltages on the deflection plates will be suitably balanced with respect to anode voltage, resistors 120, 122, 124, and 126 are connected between the deflection plates 20, 22 and ground.

It can be seen that the apparatus shown will provide an indication (a) of tube operativeness (by screen illumination); (b) of insufficient degassing or gas leakage (by internal "glow"); (c) of heater to cathode shorts (by the indicator 72); (d) of control grid cathode shorts, or open control grid connections (by effect of varying the potentiometer 76); (e) of high voltage anode arcs (by the indicator 100); (f) of screen defects (by moving the trace on the tube screen). Since the faults listed are among those most often encountered with cathode ray tubes, it is evident that a simple and efficient testing apparatus is provided which will furnish a rapid check of such tubes.

Since many changes could be made in the apparatus shown and described, all within the scope and spirit of the invention, the foregoing is to be construed as illustrative, and not in a limiting sense.

What is claimed is:

1. An alternating current apparatus for testing cathode ray tubes of the type including an anode and a cathode for generating an electron beam, an electrode for controlling the intensity of said beam, and means for deflecting said beam, said apparatus comprising a pair of input terminals adapted to be connected to a source of alternating voltage, a transformer having a primary winding connected to said input terminals and a secondary winding having output terminals, circuit means to connect one of said output terminals to said cathode and another of said output terminals to said anode to apply between said anode and cathode an alternating voltage derived from said source, a phase shifting network connected to said input terminals, and means to connect said network to said beam deflecting means to furnish to said deflecting means an alternating voltage shifted in phase with respect to the voltage between said anode and said cathode.

2. Apparatus as defined in claim 1 including a variable phase shifting network, means connecting said variable phase shifting network to said input terminals, and means to connect said variable phase shifting network to said beam deflecting means thereby to provide separate, variably phase-displaced, beam deflecting voltages for cathode ray tubes of the type wherein said beam deflecting means comprises two pairs of orthogonally related beam-deflection plates.

3. Apparatus as defined in claim 1 including a coil for generating a magnetic beam-deflecting field and means connecting said coil to said phase shifting network whereby to adapt said apparatus for testing cathode ray tubes either of the magnetic deflection type or of the electrostatic deflection type.

4. Apparatus as defined in claim 1 wherein said one output terminal is disposed between said another output terminal and a third output terminal on said secondary winding, a potentiometer-type resistor connected between said one output terminal and said third output terminal and having a movable tap, and means to connect said tap to said beam control electrode in said cathode ray tube whereby to provide out-of-phase voltages between said anode and cathode and between said control grid and cathode.

5. Apparatus as defined in claim 1 wherein said circuit means to connect said another output terminal to said anode includes a second secondary winding on said transformer, a normally closed switch connected across said second secondary winding to normally connect said anode directly to said another output terminal whereby to add the voltage across said second secondary winding to the normal voltage between said anode and cathode by opening said switch, and means in circuit with said second secondary winding for indicating alternating current flow to said anode.

6. In an apparatus for testing a cathode ray tube comprising an anode and a cathode for generating an electron beam and means for deflecting said beam, in combination, a pair of input terminals adapted to be connected to a source of alternating voltage, output terminals adapted to be connected to said anode and said cathode, a circuit including voltage step-up means connected between said input and output terminals to develop from alternating voltage at said input terminals an alternating voltage of increased magnitude across said output terminals, and a circuit including phase shifting means for connecting said beam deflecting means to said input terminals to transfer alternating voltage from said input terminals to said beam deflecting means in phase shifted relation with respect to said voltage across said output terminals.

7. Apparatus for testing a cathode ray tube having a cathode, a control grid, an anode, beam deflecting means, and a cathode-heater filament, said apparatus comprising a transformer having a primary winding, a first secondary winding on said transformer having a plurality of output terminals intermediate the ends thereof, a potentiometer-type resistor connected between one end of said first winding and a first terminal adjacent thereto and having a movable arm, means to connect said control grid and said cathode to said movable arm and to said first terminal, respectively, a second secondary winding on said transformer connected in series with said first winding at the other end of said first winding, a normally closed switch connected across said second winding, means to connect said windings and said indicator in series with said anode, said indicator being adapted to indicate alternating current flow to said anode, a third secondary winding on said transformer, means to connect said filament across said third winding, an indicator connected to indicate current flow between said first and third windings, a pair of input terminals adapted to be connected to a source of alternating voltage, connections from said primary winding to said input terminals, a second transformer having a primary winding and a secondary winding, a phase-shifting circuit connecting said second transformer primary winding to said input terminals, and means to connect said second transformer secondary winding to said beam deflecting means.

RALPH S. COATE.

REFERENCES CITED

The following references are of record in the file of this patent:

UNITED STATES PATENTS

| Number | Name | Date |
|---|---|---|
| 2,444,036 | Crost | June 29, 1948 |